(12) United States Patent
Arndt

(10) Patent No.: US 10,955,153 B2
(45) Date of Patent: Mar. 23, 2021

(54) SOLAR AIRCOOLER

(71) Applicant: Paul Riis Arndt, Højbjerg (DK)

(72) Inventor: Paul Riis Arndt, Højbjerg (DK)

(73) Assignee: Paul Riis Arndt, Højbjerg (DK)

( * ) Notice: Subject to any disclaimer, the term of this patent is extended or adjusted under 35 U.S.C. 154(b) by 0 days.

(21) Appl. No.: 15/765,009

(22) PCT Filed: Sep. 21, 2016

(86) PCT No.: PCT/EP2016/072360
§ 371 (c)(1),
(2) Date: Mar. 30, 2018

(87) PCT Pub. No.: WO2017/055148
PCT Pub. Date: Apr. 6, 2017

(65) Prior Publication Data
US 2018/0274806 A1     Sep. 27, 2018

(30) Foreign Application Priority Data

Sep. 30, 2015   (EP) .................................... 15187555

(51) Int. Cl.
| | |
|---|---|
| *F24F 5/00* | (2006.01) |
| *H02S 40/42* | (2014.01) |
| *H02S 20/26* | (2014.01) |
| *H02S 40/30* | (2014.01) |
| *H02S 20/22* | (2014.01) |
| *H02S 30/10* | (2014.01) |
| *H02S 40/34* | (2014.01) |
| *H02S 40/38* | (2014.01) |

(Continued)

(52) U.S. Cl.
CPC ............ *F24F 5/0046* (2013.01); *F24F 5/001* (2013.01); *H02J 3/385* (2013.01); *H02S 20/22* (2014.12); *H02S 20/26* (2014.12); *H02S 30/10* (2014.12); *H02S 40/30* (2014.12); *H02S 40/34* (2014.12); *H02S 40/38* (2014.12); *H02S 40/42* (2014.12); *H02S 40/425* (2014.12); *F16M 1/00* (2013.01); *F24F 2005/0067* (2013.01); *Y02A 30/272* (2018.01); *Y02B 10/10* (2013.01); *Y02B 10/20* (2013.01)

(58) Field of Classification Search
CPC . F24F 5/0046; F24F 2005/0067; H02S 40/38; H02S 40/42; H02S 40/34; H02S 30/10; H02S 20/26; Y02B 10/20; Y02B 10/14; Y02B 10/24; Y02A 30/272
See application file for complete search history.

(56) References Cited

U.S. PATENT DOCUMENTS

| | | | |
|---|---|---|---|
| 6,134,902 A | 10/2000 | Curry | |
| 9,738,137 B2 * | 8/2017 | Fisher | .................. B60H 1/3227 |

(Continued)

FOREIGN PATENT DOCUMENTS

| | | |
|---|---|---|
| FR | 3 015 810 A1 | 6/2015 |
| WO | WO 2013/130562 A1 | 9/2013 |

*Primary Examiner* — Kun Kai Ma
(74) *Attorney, Agent, or Firm* — Holland & Hart LLP

(57) ABSTRACT

The present invention relates to a compact, fully integrated solar powered airconditioning (A/C) device for recycling and cooling the air inside buildings, which device comprises a photovoltaic (PV) solar cell, a Maximum Power Point Tracking (MPPT) Charge Controller, a battery unit and a vapor compression air cooling device.

12 Claims, 5 Drawing Sheets

2) Battery
3) MPPT/Chargecontroller
6) PV-panel
12) External power supply
13) Switch
22) Evaporator
28) Condensor
32) Expandable PV panels
33) DC compressor
34) Expansion valve

(51) Int. Cl.
*H02J 3/38* (2006.01)
*F16M 1/00* (2006.01)

(56) References Cited

U.S. PATENT DOCUMENTS

| | | | |
|---|---|---|---|
| 2005/0092005 A1* | 5/2005 | Wunderlich | B60H 1/00428 62/244 |
| 2009/0183853 A1* | 7/2009 | Chen | F24D 11/0221 165/48.2 |
| 2009/0255646 A1* | 10/2009 | Kodeda | F24D 3/18 165/45 |
| 2009/0301119 A1 | 12/2009 | Chen | |
| 2010/0248605 A1* | 9/2010 | Sharma | B60H 1/28 454/140 |
| 2011/0296218 A1 | 12/2011 | Kim et al. | |
| 2014/0285342 A1* | 9/2014 | Makino | G08B 13/2491 340/556 |
| 2015/0251923 A1* | 9/2015 | Janssen | C02F 1/14 203/10 |
| 2015/0360568 A1* | 12/2015 | Champagne | B60L 1/02 296/156 |
| 2016/0327308 A1* | 11/2016 | Deivasigamani | E04C 2/521 |
| 2017/0305292 A1* | 10/2017 | Minamiura | B60L 3/0046 |

\* cited by examiner

6) PV-panel
19) Expanded polystyrene separation wall
22) Evaporator
23) Evaporator fan
24) Internal air intake
25) Internal air exhaust
26) Condensate drain
27) Ambient air intake
28) Condenser
29) Condenser fan
30) Ambient air exhaust
2+3+8) Box containing MPPT and Battery
31) External house wall 2+3+8) Box containing MPPT and Battery
6) PV-panel
22) Evaporator
23) Evaporator fan
24) Internal air intake
25) Internal air exhaust
26) Condensate drain
27) Ambient air intake
28) Condenser
29) Condenser Fan
30) Ambient air exhaust
31) External house Wall
34) Expansion valve

SOLAR AIRCOOLER

FIELD

The present invention relates to a compact, fully integrated solar powered airconditioning (A/C) device for recycling and cooling the air inside buildings, which device comprises a photovoltaic (PV) solar cell, a Maximum Power Point Tracking (MPPT) Charge Controller, a battery unit and a vapor compression air cooling device. The airconditioning device may optionally be fitted with connectors for being powered by external electrical sources.

BACKGROUND

The global population grows by about 80 million per year, urbanization increases almost daily as people both in developed and developing countries seek better jobs or livelihoods in the big cities, and partly as a result of these two tendencies, the climate is growing warmer worldwide as people use eg. fossil fuel power for lighting, for powering machines—and most significantly, for cooling. This trend is now highly significant in areas having hot and/or humid climates, where urbanization has not been so pronounced before, due to the inhospitable climatic conditions.

There is a very direct link between working temperature and working efficiency: In "Air-Conditioning America", a 1957 survey is cited in which 90% of American firms named cooled air as the single biggest boost to their productivity. Further, a Yale mapping project revealed an almost linear correlation between mean annual temperatures and productivity per head. People in the coolest climates was found to generate 12 times the economic output of those in the hottest.

Cooling also lowers mortality. A 2006 survey of six South Korean cities, for instance, indicated that a rise of just 1° C. over normal summer peak temperatures prompted a rise of between 6.7% and 16.3% in mortality from all causes. On the hottest days during a 2003 heatwave in Spain, according to a health-ministry survey, the increase over normal mortality rates was around 25% (The Economist, January 2013).

Thus, the requirement for artificially cooling the environment for both working and habitation purposes is rapidly increasing. In most countries, the bulk of electricity that runs air conditioners in homes and businesses is drawn from "the grid", which is largely powered by fossil fuels, most prominently coal. Even if some countries have succeeded replacing a large proportion of fossil fuels by renewable energy such as wind, solar or hydroelectric power, coal is still a major energy source on a global scale.

The availability of renewable energy to the grid, including solar is steadily increasing, but diesel generators and other fossil fuel continue to dominate off-grid power supplies. To make airconditioning powered by renewable energy more attractive to the end user, it should thus be supplied by means of a stand-alone, easy to install device which is easy to operate and can provide cooling day and night—also in periods with faltering energy production from the "renewable source".

To the end-user who does not already have a wind turbine or an array of solar cells on his roof, acquiring renewable-energy powered airconditioning for his home is not an easy decision. Traditional installation of renewable energy power in a private home is a big and expensive undertaking.

Solar powered air conditioning systems have emerged on the market, for example as presented by the Solarwhiz and the ACDC12b Solar AC unit from hotspot energy.

The Solarwhiz offers a single decentralized solution providing running-cost free ventilation of buildings. However, the cooling of the Solarwhiz is limited by the ambient temperature as it only moves hot air out and ambient air in the building, ie it does not actively cool the air.

The ACDC12B air-conditioning system does provide active cooling, but it is not a stand-alone device, but has the solar panels and airconditioning unit separated. The device runs primarily on solar power during the day, but requires power from the "grid" as needed since no battery unit back-up is integrated.

There is thus a need for a compact, stand-alone, easy to install airconditioning device powered by renewable energy, which can be connected in a "plug and play" fashion to the room or building which requires cooling.

DEFINITIONS

As used herein, the abbreviation "PV" refers to Photovoltaic. Throughout the application, the terms "PV-panel", "PV panel" and "PV solar cell panel" all refer to a photovoltaic solar cell or photovoltaic solar cell assembly. As used herein, the abbreviation "MPPT" refers to Maximum Power Point Tracking, which is a PV panel optimizer usually combined with a battery charge controller. As used herein, the term "battery unit" refers to one or more rechargeable batteries, a battery pack or an array of batteries. As used herein, the term "Li-ion" or "Lithium ion" refers to a rechargeable Lithium-ion battery, battery pack or array of batteries. As used herein, the term "DC" refers to Direct Current. As used herein, the term "AC" refers to Alternating Current. As used herein, the term "Converter" refers to a DC/DC converter, used to change voltage from 24-48V. As used herein, the term "grid" refers to an interconnected network for delivering electricity from suppliers to consumers, typically the main or national electrical grid. Similarly, as used herein the term "offgrid" refers to not being connected to a grid, mainly used in terms of not being connected to the main or national electrical grid. The term "load" refers to an electrical component or portion of a circuit that consumes electric power appliances and lights. "Load" may also refer to the power consumed by a circuit.

SUMMARY OF INVENTION

In the following reference is made to numbered components shown in FIGS. 1-5.

The inventors of the present application have had the ambition to develop an easily installed and consumer friendly unit or device able to provide cooling based on solar power. The original inspiration for this work came from the development of a device meant for air heating (described in int. application WO2008095502), the idea being that a heating process could be reversed into a cooling process. This was found to be technically highly challenging, and several other technologies were therefore considered.

The first idea which seemed viable was based on the assumption that solar energy combined with water evaporation would result in cost-effective cooling. The adsorption principle is dependent on the ability to increase the humidity of inflowing air, and assumes modest temperature differences (3-7 degrees) between the outdoor air and the desired indoor temperature, subject to humidity. Cooling through adsorption allows for cooling through adding water vapor to the air, causing a phase change, which cools the air. However, since the air should later be dehumidified, and the adsorption based aircooler continuously rehumidified, the process was found to require more energy than earlier assumed, and was thus replaced by a more efficient method.

Brine based systems were also considered, but such systems may involve unintended environmental issues, or may become excessively complex and costly.

Finally, the inventor found that solar powered electric vapor-compression based cooling was superior to absorption and adsorption cooling, and as a result hereof have developed a highly compact technical solution, which may combine simple micro-MPP trackers with solar panels of an open circuit voltage for the range 40-70 volt, which allows for a greater range of solar panels to be applied.

The solar powered air-conditioning (A/C) device of the present invention further comprises a battery unit (2), see FIGS. 1-5, which is charged by the solar panel (6), providing power to the compressor. The excess power stored in the battery unit (2) is drawn upon when the PV-panel cannot generate sufficient power. It is possible to expand the power generation capacity by adding at least one or two more PV-panels (32). Alternatively one, two or more discrete/detachable solar power storage modules can be connected, wherein a PV-panel is combined with a battery unit and a charge controller as a stand-alone module, thereby not only boosting the maximum cooling power of the solar power airconditioning unit considerably, but additionally adding substantial back-up power.

Various ways of combining the functional components of the solar powered A/C device were reviewed, and it was confirmed by tests and prototype construction that the most efficient solution was to combine all the power-generating components into the above-mentioned, detachable, stand-alone solar power storage module, comprising:

a battery unit (2);
a PV panel (6) that charges the battery unit (2);
a Maximum Power Point Tracking (MPPT) charge controller (3) electrically connected to the battery unit (2) and the solar cell unit (6),
insulating means for reducing the heat transfer from the PV solar cell (6) unit to the battery unit (2), and
cooling means for maintaining the battery unit (2) at a temperature not exceeding a threshold value.

The solar powered A/C device of the present invention thus comprises a detachable solar power storage module as described above, and a cooling module, which comprises:

A vapor-compression refrigeration system;
Interior and exterior flow chamber;
One or more fans;
Insulating means for reducing the heat transfer from the solar power storage module to the interior flow chamber, and
In- and outlet tubes and wires.

Additionally, the solar powered A/C device comprises a control module allowing for remote control of the A/C unit. The control module can be remotely operated by a discrete remote control unit having a display, which communicates with the control module via blue-tooth, infrared or wifi wireless etc., or alternatively by using an app installed on a smartphone or tablet computer that also allows for encrypted communication with the control module.

The three modules comprising the solar powered A/C device of the present invention are held together, or assembled, by a mechanical frame.

The main challenge has been to cope with the temperature gradient through the solar powered A/C device. The solar power storage module, which is placed in very close proximity to the cooling module, may be heated by sunlight to temperatures above ambient air temperature, and at the same time it is desired to use the cooling module to lower the temperature of air flowing through said cooling module.

These challenges have now been overcome by optimizing the choice of components and not least the device geometry for the individual modules separately, which will be further described in the following.

In a first aspect there is thus provided a solar power airconditioning unit, comprising the following components:

a. A detachable solar power storage module, comprising
  I. a battery unit (2);
  II. one or more PV panels (6) that charge the battery unit (2);
  III. a Maximum Power Point Tracking (MPPT) charge controller (3) electrically connected to the battery unit (2) and the solar cell unit;
  IV. insulating means for reducing the heat transfer from the PV panel (6) to the battery unit (2); and
  V. cooling means for maintaining the battery unit (2) at a temperature not exceeding a threshold value,
and
b. A cooling module, comprising
  VI. a vapor-compression refrigeration system (28) and (22);
  VII. an interior and an exterior flow chamber;
  VIII. one or more ventilating fans (23 and 29);
  IX. insulating means for reducing the heat transfer from the solar power storage module to the interior flow chamber, and
  X. in- and outlet tubes and wires,
and
c. A control module allowing for direct or remote control of the solar power airconditioning unit,
and
d. A frame for fixating and assembling said power storage module, cooling module and control module into a single unit.

In certain circumstances it may however be more convenient or practical to separate the solar power storage module from the cooling module, and place parts of the cooling module indoors. This requires a smaller hole to be drilled through the external house wall, which may be advantageous, and also allows for an easier installation of the cooling module.

In a second aspect, there is thus provided a solar power airconditioning unit comprising the same components as in the first aspect of the present invention, but where the evaporator (22) evaporator fan (23) condensate drain (26) and expansion valve (34) are placed indoors in a single unit, see FIG. 5. The indoor unit is preferably encased in a plastic casing to prevent access to moving parts and in a further embodiment accommodates means for the end user to control the system without a remote control.

Various embodiments of the invention are disclosed in the following detailed description and the accompanying drawings.

FIGURES

FIG. 1 is a diagram showing the electrical component design of the solar powered air-conditioning device, including extension options.

FIG. 2 Sidewise view of a simplified solar powered air-conditioning device mounted on an exterior house wall (20). The frame and outer shell are not shown in order to display the components and airflows inside the device.

Figure 1:
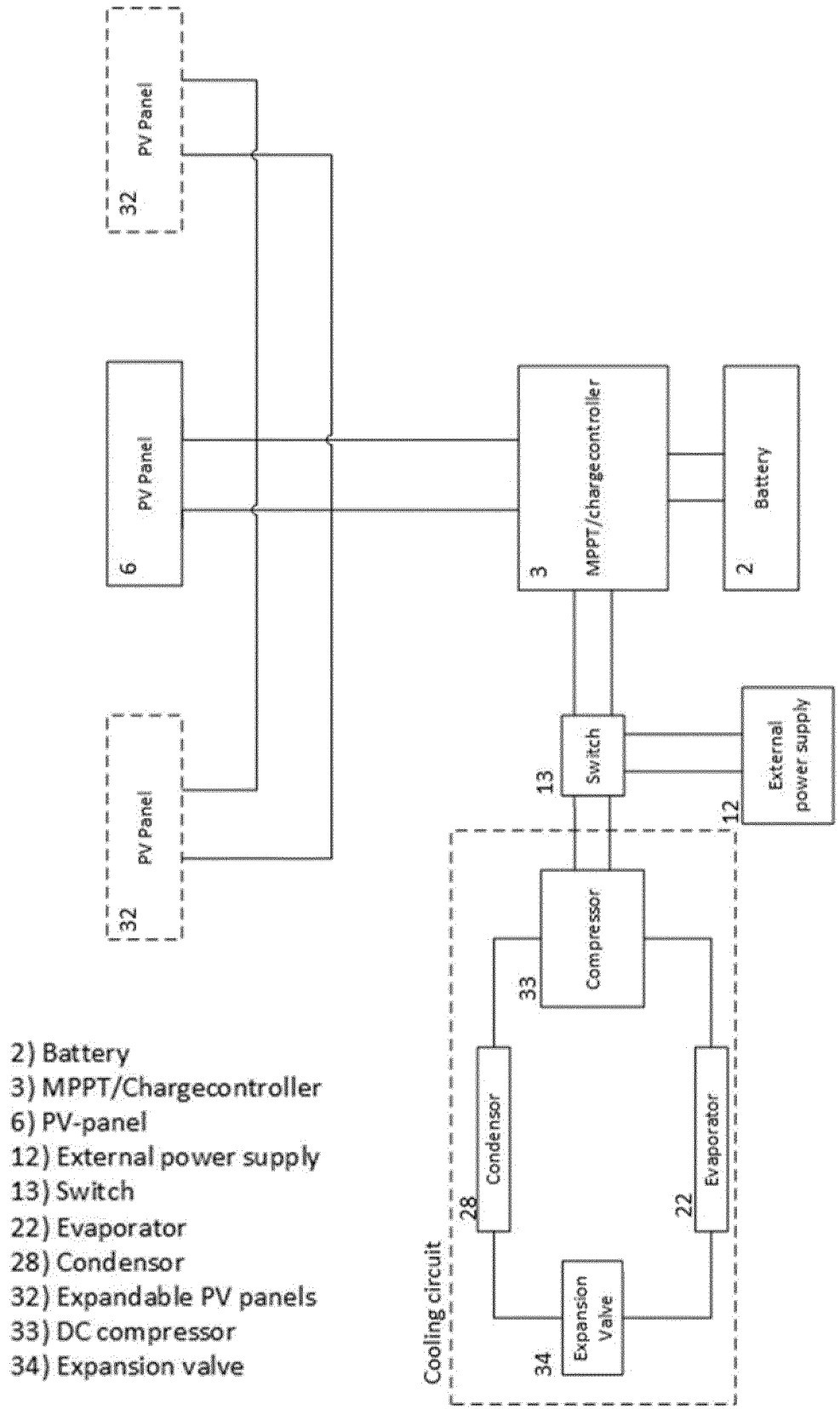
Figure 2:
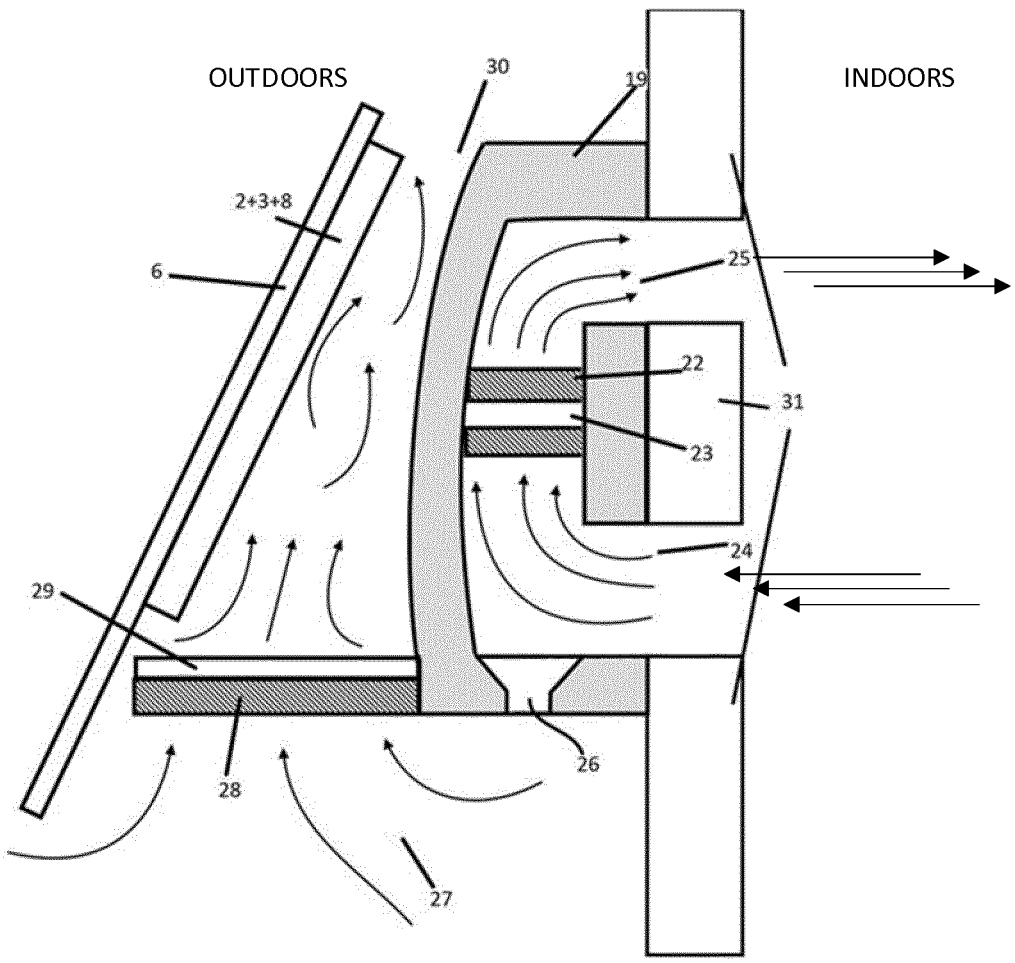
Figure 3:
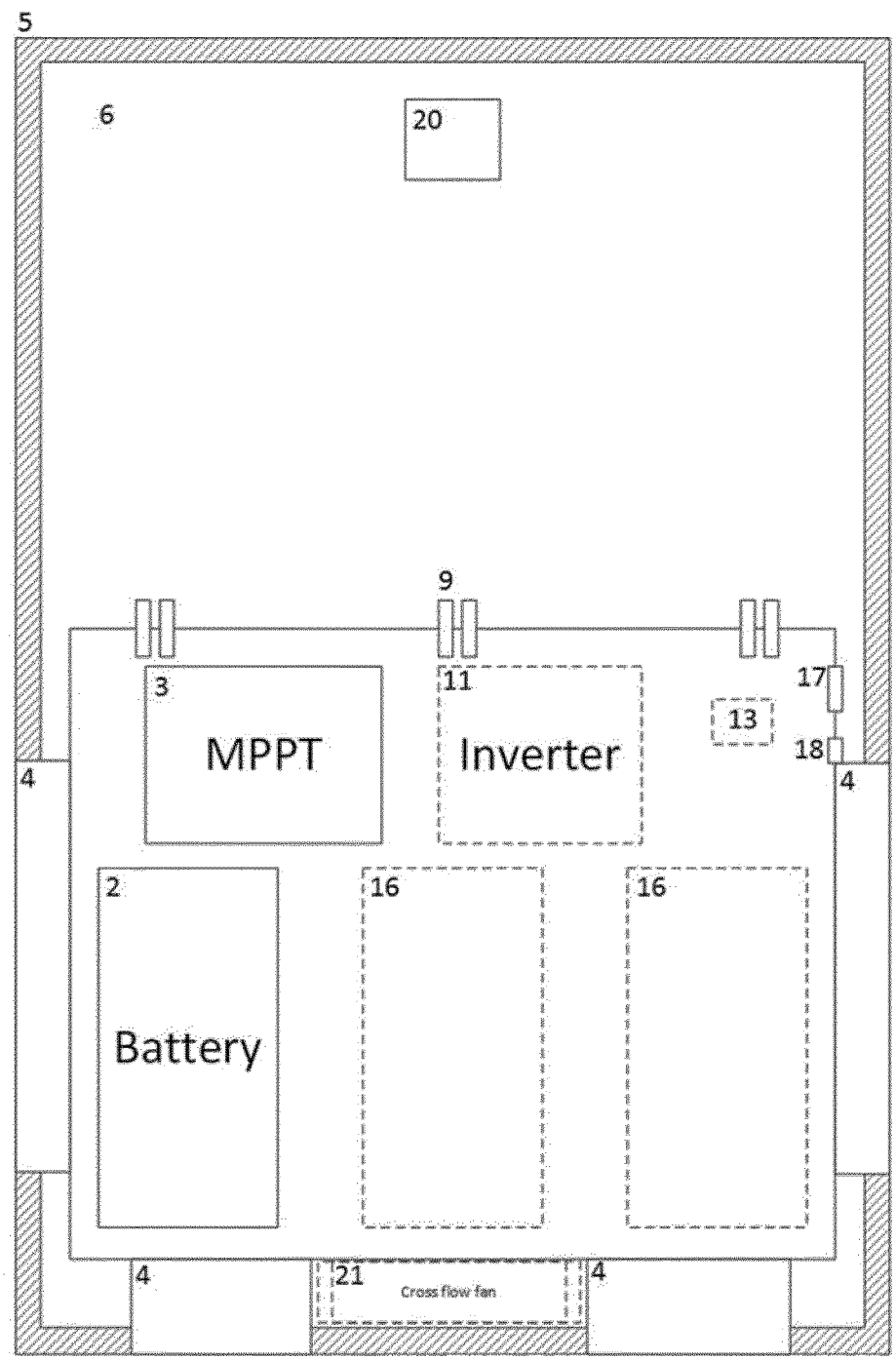
FIG. 3 is a rear view of the (simplified) detachable solar power storage module, which indicates the various components and their approximate relative placement.
Figure 4:
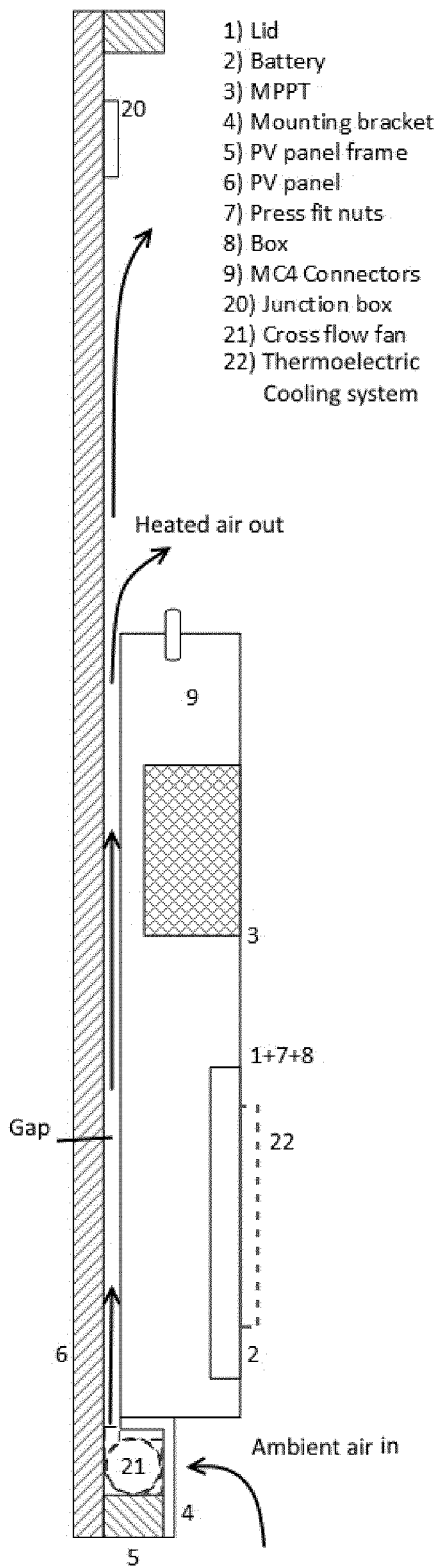
FIG. 4 is a vertical view of the (simplified) detachable solar power storage module, including indications of airflows through the gap between component box (8) and backside of the PV panel (6).
Figure 5:
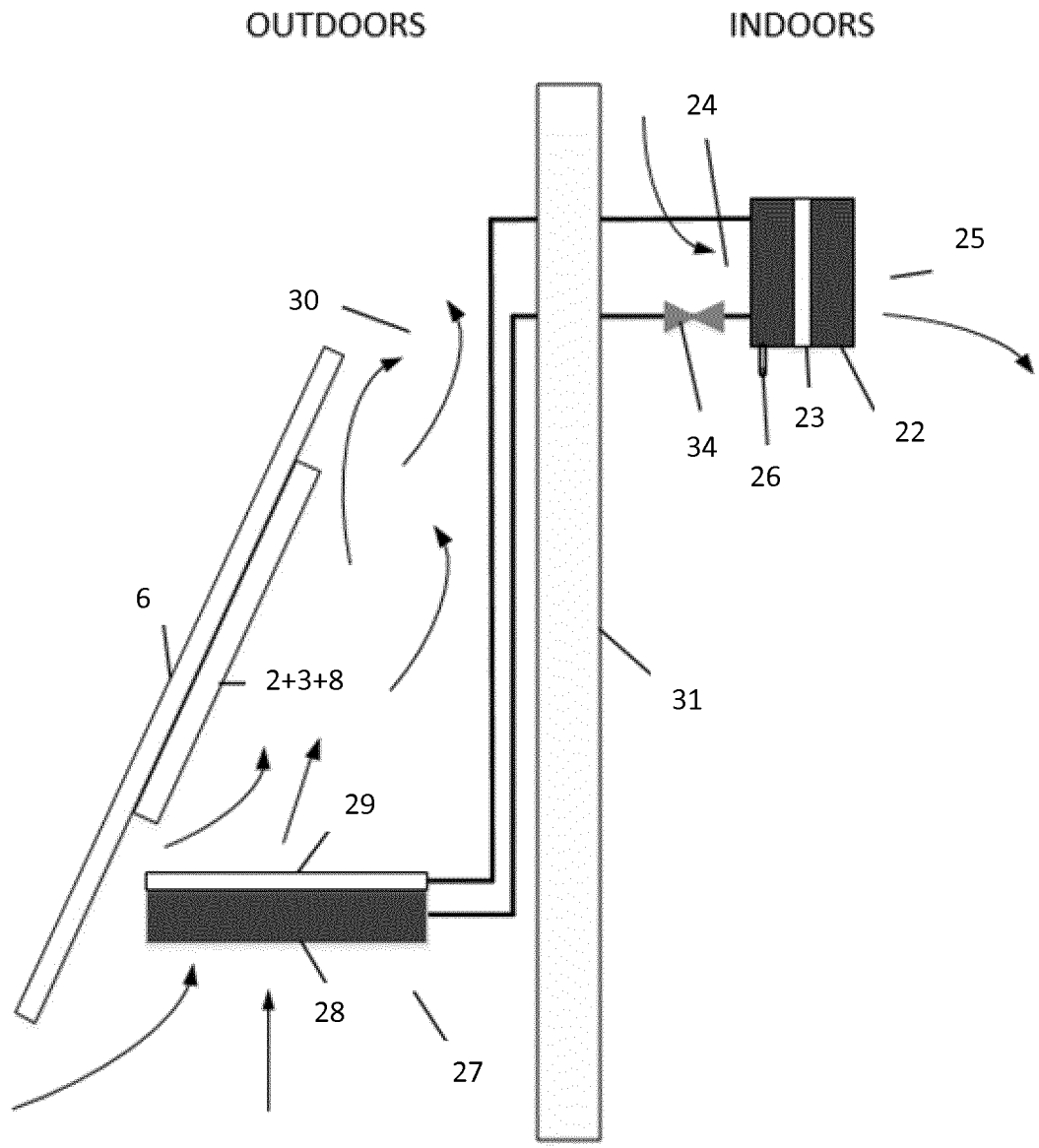

FIG. 5 Sidewise view of a simplified solar powered air-conditioning device mounted on an exterior house wall (20). In this version of the device, the evaporator (22) evaporator fan (23) condensate drain (26) and expansion valve (34) are all placed indoors in a single unit. The frame and outer shell are not shown in order to display the components and airflows inside the device.

DETAILED DESCRIPTION OF THE INVENTION

The solar power airconditioning unit according to the present invention comprises four components: a detachable solar power storage module, a cooling module, a control module and a frame for fixating the other three components into a single unit.

The detachable solar power storage module has the function of capturing energy from sunlight by means of the built-in PV panel (6), and, in principle also from other light sources such as artificial light, and powering the cooling module and other electrical components integrated in the solar power airconditioning unit. It also has the function of storing surplus energy in the built-in battery unit (2) to be used when the production from the PV panel (6) is lower than the requirement from the cooling module, including the need to flexibly detach consumption and production times, cooling e.g. at night from power charged onto the batteries during the day.

The cooling module has the function of recirculating and cooling indoor or interior, air through a refrigeration circuit. The cooling module comprises electrical equipment, such as a vapour-compression refrigeration system and one or more ventilating fans, which are all powered by the solar power storage module. The cooling module may also be powered by external electrical sources.

The control module has the function of allowing for remote control of the solar power airconditioning unit, and comes with a remote control unit. It may be powered by the solar power storage module.

The frame has the primary function of fixating and assembling said power storage module, cooling module and control module into a single unit. Moreover, it allows for attachment of an outer shell or casing, which shields the inside of the solar powered airconditioning device from the environment In a first aspect there is thus provided a solar power airconditioning unit, comprising the following components:
 a. A detachable solar power storage module, comprising
  I. a battery unit (2);
  II. a PV panel (6) that charges the battery unit (2);
  III. a Maximum Power Point Tracking (MPPT) charge controller (3) electrically connected to the battery unit (2) and the solar cell unit (6);
  IV. insulating means for reducing the heat transfer from the PV panel (6) to the battery unit (2); and
  V. cooling means for maintaining the battery unit (2) at a temperature not exceeding a threshold value,
  and
 b. A cooling module, comprising
  VI. a vapor-compression refrigeration system (28) and (22);
  VII. an interior and an exterior flow chamber;
  XI. one or more ventilating fans (23 and 29);
  VIII. insulating means for reducing the heat transfer from the solar power storage module to the interior flow chamber, and
  IX. in- and outlet tubes and wires,
  and
 c. A control module allowing for remote control of the solar power airconditioning unit,
 and
 d. A frame for fixating and assembling said power storage module, cooling module and control module into a single unit.

In a preferred embodiment the detachable solar power storage module has the approximate outer dimensions of a standard PV solar cell, for example approximately 1600× 1060 mm and a depth of about 80 mm.

The solar power storage module according to the present invention functions by converting solar energy into electricity by the photovoltaic effect, which captures energy from sunlight, and, in principle also from other light sources such as artificial light. The solar energy captured by the PV solar cell (6) is not consistent due to changes in the surrounding environment such as variations in intensity of sunlight (solar irradiation) and ambient temperatures, and therefore a battery unit (2), which is electrically connected to and charged by the solar cell unit, is used to store the electricity generated by the PV solar cell (6).

In order to maximize the efficiency of the capturing of solar energy by the battery unit (2), a Maximum Power Point Tracking (MPPT) charge controller (3) is electrically connected to the battery unit (2) and the solar cell unit. The MPPT charge controller (3) is an electronic DC to DC converter that continuously compares the output of the PV solar cell with the actual battery voltage, and optimizes the match between the PV panel (6) and the battery unit (2) by converting a higher voltage DC output from solar panels down to the lower voltage needed to charge the battery unit (2). For load output the current is drawn directly from the MPPT. The battery unit (2) is only used as a backup if the load requirement is higher than the actual PV panel production. If the load requirement is lower than the actual PV panel production, the surplus energy is used to charge the battery unit (2).

During the operation of the solar powered airconditioning unit according to the present invention, the PV solar cell is heated to temperatures considerably above ambient; typically at least 20-30° C. above ambient temperature, and it is not uncommon for a PV solar cell to reach a temperature of 75° C. This is a problem since a typical PV solar panel has a negative temperature coefficient, and thus the efficiency of a solar cell can drop as much as 25% under hot conditions.

The increasing temperature of the PV solar cell during operation is also a problem for the battery unit (2) integrated in the detachable solar power storage module, as batteries are sensitive to both high charging and decharging temperatures. Therefore means are provided for preventing the battery unit (2) to overheat. These means comprise both insulation and cooling means, which will be described further in the following together with a description of the individual components of the invention.

Managing the temperature is important as most of the components have a critical max temperature that, if exceeded, will cause failure. The battery can withstand up to 80° C. without permanent damage however, for prolonged periods it should not exceed 45° C. The panel must not exceed 85° C. as it can cause delamination and subsequent failure.

The solar power storage module may also be equipped with active means for removing heat, which may be powered by the integrated battery unit (2). This may in one embodiment be accomplished by including a battery-powered fan (21) in the construction, which may boost the natural convectional flow of air through the module. Alternatively, as mentioned above, a battery-powered thermoelectric element (22) such as a Peltier device for cooling the battery unit (2) to optimal operating conditions may be employed. In a specific embodiment, a battery unit is employed which comprises a thermal sensor and an integrated thermoelectric element.

In an embodiment the cooling means for maintaining the battery unit (2) at a temperature not exceeding a threshold value further comprises a thermoelectric element (22) powered by the battery unit (2). The thermoelectric element (22) may for example be a Peltier element.

These embodiments, where active means for removing heat are included in the solar power storage module, may be relevant for geographical areas having excessively hot climates where the ambient air temperature is too high to cool the battery unit passively. The active cooling system will run in bursts, cooling the battery unit for a few minutes when the thermal sensor detects the threshold temperature, and then turning off.

The threshold temperature may vary between battery variants, but will typically be in the range of 40-55° C.

The detachable solar power storage module according to the present invention thus comprise three functional components: A PV solar cell panel (6), a MPPT charge controller (3) and a battery unit (2), and additionally comprises insulation and cooling means to prevent the overheating of temperature sensitive components.

The MPPT charge controller (3) and battery unit (2) are contained within a compact, closed box (8) made from folded sheet metal which serves the purposes of firstly creating a layer of stationary air, which insulates the battery from the heat emanating from the rear side of the PV solar panel (6), secondly prevents any accidental access to components carrying an electric current, and thirdly protects the components from the environment, thereby increasing component life and durability. The box (8) is closed off with a top lid (1) which serves as a platform to mount the components (MPPT, battery, inverter and misc. printed circuit boards (2+3), a heat sink as well as for closing off access. Press fit nuts (7) are installed in the box sides to ease the assembly process. A mounting bracket (4) is installed on two or three of the box sides (dependent of the final size) through the press fit nuts. Self-tapping screws are used to mount the construction on the rear surface frame (5) of the solar panel (6). Three pairs of MC4 connectors (9) are installed to allow modular expansion, typically to one side, placed asymmetrically to allow for optimal packaging of the PV panels.

The compact design of the box (8) allows for integration with various types of commercial PV solar panels. Thus, in one embodiment the battery unit (2) and MPPT charge controller (3) are contained within a box (8) closed with a top lid (1). In a preferred embodiment the battery unit (2) and MPPT charge controller (3) are fastened to the underside, or subsurface of the top lid (1). In another preferred embodiment the top lid (1) functions as a heat sink.

The gap between the box-shaped underpart (8) and the rear surface of the PV panel (6) serves two important purposes: Firstly it minimizes the heat transfer between the PV panel and the box-shaped underpart (8) by preventing direct contact between the two; secondly, the gap establishes a natural channel or air duct allowing ambient air to flow in between the two surfaces and by natural convectional flow letting the heated air escape to the environment. Both these functions assist in lowering the PV panel temperatures, thereby enabling suitable working conditions for the battery and electronic components of the solar power storage module mounted inside the box-shaped underpart (8). The gap in one embodiment has parallel sides, ie. the planes of the rear surface of the PV panel (6) and the box-shaped underpart (8) are substantially parallel.

In a further embodiment there is thus provided a solar power storage module wherein a gap is defined between the PV panel (6) and the closed box (8), allowing a stream of air to pass between the surfaces of the PV panel (6) and the closed box-shaped underpart (8). In a preferred embodiment the gap should be at last 10-20 mm, preferably 15 mm. The stream of air can be occasioned by natural convection or by means of a fan or ventilator or other artificial means.

In a further embodiment a stream of air is forced or blown through the gap between the PV panel (6) and the closed box-shaped underpart (8) by the action of a cross-flow fan (21) powered by the battery unit (2) and placed below said closed box (8).

In yet a further embodiment the cooling means are capable of maintaining the battery unit (2) at a temperature not exceeding 55° C. In a preferred embodiment the cooling means are capable of maintaining the battery unit (2) at a temperature not exceeding 40° C., for ambient temperatures up to 50° C.

In a preferred embodiment of the invention, there is thus provided a detachable solar power storage module, comprising the following components:
  a. a battery unit (2);
  b. a PV panel (6) that charges the battery unit (2);
  c. a Maximum Power Point Tracking (MPPT) charge controller electrically connected to the battery unit (2) and the solar cell unit (6), the MPPT continuously
    I. comparing the output of the PV panel (6) with the actual battery voltage,
    II. supplying the required output from the PV panel (6) as well as the battery unit (2), to match the load (10+14)
    III. optimizing the output of the PV solar panel (6) and
    IV. converting the output of the PV solar panel (6) to the optimum voltage required to charge the battery unit (2);
  d. insulating means for reducing the heat transfer from the PV panel (6) to the battery unit (2), and
  e. cooling means for maintaining the battery unit (2) at a temperature not exceeding a threshold value,
  wherein all components a-e are contained within a single module, and wherein the battery unit (2) and MPPT charge controller (3) are further contained within a box (8) closed with a top lid (1) wherein said battery unit (2) and MPPT charge controller (3) are fastened to the underside, or subsurface of the top lid (1).

As mentioned above, by mounting the battery unit (2) and other components inside the box-shaped underpart (8), for example on the top lid (1) of the box (8), a volume of stationary air is created inside the box-shaped underpart (8), between the battery surface and the gap. A layer of stationary air has an insulating effect, which reduces the heat transfer between the components and the rear surface of the PV solar panel. Other insulating means may be applied, such as layers of mineral or glass wool, or a porous inorganic material, such as silica aerogel or another temperature resistant, insulating material having low thermal conductivity. Closed cell insulating means may also be applied, especially under conditions of high air humidity when there is a risk of dew condensing inside the solar power storage module. A layer of closed-cell spray foam such as polyurethane foam may thus be applied.

Thus, in another embodiment there is provided a solar power storage module according to the first aspect of the present invention wherein said insulating means for reducing the heat transfer from the PV panel (6) to the battery unit (2) is comprised by the volume of stationary air inside the closed box-shaped underpart (8).

In another embodiment said insulating means for reducing the heat transfer from the PV panel (6) to the battery unit (2) further comprises a layer of insulating material selected from mineral wool, glass wool or a porous inorganic material, such as silica aerogel or another temperature resistant, insulating material having low thermal conductivity.

In yet another embodiment said insulating means for reducing the heat transfer from the PV panel (6) to the battery unit (2) comprises a layer of closed-cell spray foam, such as polyurethane foam.

Additionally, by ensuring a good contact between the subsurface of the top lid (1) of the box (8) and the surfaces of the battery unit (2) and other components, eg. by the use of suitable heat sink paste, the top lid (1) functions as an efficient heatsink, dissipating the generated and/or absorbed heat to the environment through the ambient air. This increase in passive cooling helps keeping the temperature on mainly the batteries low, thereby ensuring a longer battery life.

The detachable solar power storage module has the approximate outer dimensions of a standard PV solar cell, ie. approximately 1600×1060 mm and a depth of about 80 mm. The dimensions may vary between variants.

The mechanical construction of the detachable solar power storage module has been designed to passively enable a natural, convectional flow of air through the module, which is sufficient under normal conditions to maintain suitable working temperatures for the battery unit (2) and electronic components. For geographical areas having excessively hot climates, the detachable solar power storage module may be equipped with active means for removing heat, such as fans or thermoelectric elements, which may be powered by the integrated battery unit (2). The detachable solar power storage module can be detached from the solar power airconditioning unit and placed elsewhere, in which case a replacement front panel must be installed to cover the remaining components and electronics inside the airconditioning unit.

The PV panel (6) is responsible for the generation of electrical energy. The current and voltage is dependent on the type and number of panels. According to a preferred embodiment of the present invention, backside contact or rear contact solar cell panels are employed, as they achieve higher efficiency by moving all or part of the front contact grids to the rear, or backside of the device. The higher efficiency potentially results from the reduced shading on the front of the cell. In another preferred embodiment one PV panel (6) is integrated in the power storage module; it is also possible to connect at least one or two additional PV panels (32).

In one embodiment the detachable solar power storage module is equipped with one PV solar cell panel (6). In another embodiment the solar power airconditioning unit is powered by a total of two PV solar cell panels. In yet another embodiment the solar power airconditioning unit is powered by a total of three PV solar cell panels (6+32).

In an embodiment, the one or more PV solar cell panels are chosen from commercially available options having an expected daily production between 1.5 kWh-2 kWh, dependent of the geographical location, time of year and the specific angle and orientation of the panel. In a preferred embodiment, the preferred PV solar cell panel is a SunPower E20/333Wp panel.

The battery unit (2) is required to store the generated energy that is not being used, either due to intermittent loads or due to an overproduction from the PV solar cell panel (6). This enables the detachable solar power storage module to continue to discharge the required energy when there is no power generation, or when the requirement for cooling is higher than the generated power from the PV solar cell panel (6). The solar powered airconditioning unit according to the present invention may also be powered by external power, including grid power, in situations where neither the generated power from the PV solar cell panel (6) nor the energy stored in the battery unit is sufficient to power the airconditioning unit.

The compact design of the detachable solar power storage module according to the present invention requires batteries with a high energy density and a high efficiency, leading to lower heat generation. Not least due to the rapid development of smartphones, the Li-ion battery technology has improved significantly over the last decade. Their high energy density, good charge/discharge capabilities and efficient charging makes them ideal for use in compact designs.

In a preferred embodiment of the present invention, the battery unit (2) is one or more Lithium ion batteries. Lithium ion (Li-ion) batteries have a high energy density, which helps keeping a small form factor which is crucial for the desired compact design of the detachable solar power storage module. However just as importantly, Li-ion batteries are known to perform significantly better at high operating temperatures when compared to lead batteries. The charge/discharge range does not significantly decrease at temperatures up to 40° C., and Lithium ion batteries can withstand temperatures up to 70-90° C. without permanent damage. However, repeated exposure to high temperatures do decrease the number of charge cycles, and must thus be kept to a minimum, and for prolonged periods the temperature should not exceed 45° C. The Li-ion battery can be selected from lithium iron phosphate batteries, lithium cobaltate batteries, lithium manganate batteries, lithium cobalt manganate batteries, or any combination thereof. Lithium-ion batteries cover a wide range of different variants. Types like $LiNi_xMn_yCo_zO_2$, $LiMn_2O_4$ or $LiFePO_4$ can all potentially be used. In a preferred embodiment Lithium-ion batteries having a flat form and thus a large surface-to-volume ratio are selected, thus maximizing the available surface area for heat dissipation. Other battery unit types fulfilling the energy density requirements and having a small form factor are also possible.

In another embodiment the battery unit (2) comprises a thermal sensor and an integrated thermoelectric element (22), such as a Peltier device, for cooling the battery to optimal operating conditions. The thermoelectric element (22) is coupled with a small fan (21) and two small heatsinks. Internally in the battery, the thermoelectric element (22) induces a cold side that cools the heatsink attached to the cold side. This heatsink cools the surrounding air, which is blown out past the one or more batteries by the fan, thereby cooling them. The warm side is connected to a heatsink on the external side of the battery unit (2), where the heat is dissipated. The thermoelectric element (22) as well as the fan (21) draw power from the battery unit (2), and are controlled by a built-in microchip. The thermal sensor placed on the battery unit (2) tells the system when to activate.

In a preferred embodiment, the chosen Li-ion battery is a 24V 19.8 Ah Li-CNM (Lithium Nickel Manganese Cobalt Oxide) battery contained in a stainless steel case.

The Maximum Power Point Tracking (MPPT) charge-controller (3) is responsible for transforming the voltage down to a level that can be used to charge the battery unit (2) and ultimately power the cooling module. The MPPT capabilities enables it to optimize the power output from the PV-panel (6), ensuring the highest power generation possible.

The MPPT (3) contains a thermal sensor which is coupled to the battery unit (2). This allows the MPPT (3) to discontinue the charge- or discharge procedure if the temperature raises above a preset value.

When operating, the MPPT (3) charges the battery unit (2) when the power from the PV-panel (6) is greater than the requirement from the cooling module. If the power from the PV-panel (6) falls below the required load, the battery unit (2) will discharge to compensate if there is enough energy stored. If the battery unit (2) is fully charged and the power from the PV-panel (6) exceeds the required load, then the power production will decrease as the MPPT (3) adjusts the electrical resistance.

The two types of charge controllers most commonly used in solar power systems are pulse width modulation (PWM) and maximum power point tracking (MPPT). Both adjust charging rates depending on the battery's charge level to allow charging closer to the battery's maximum capacity as well as monitor battery temperature to prevent overheating. The MPPT was chosen over the simpler PWM as it can provide a substantial increase in the power generated. Getting the maximum amount of energy out of the solar panels is a high priority due to the foreseen power consumption of the cooling unit of the present invention.

The preferred MPPT needs to be able to handle up to 20 A from the PV panel side. This enables connecting up to three PV panels or more in parallel for a total peak power of 1 kW. Additionally the MPPT needs to have a tracking range able to cover 54.7V as well as being able to handle the open circuit voltage at 65,3V+15% or approximately 75V.

By using a MPPT charge controller, the tracking range can become an issue. As most telecom cooling systems require 48V, it would be optimal to have a DC variant of the solar power storage module running at 48V as well. This could decrease the maximum current required for the MPPT and inverter to handle, which would allow using smaller components. However, the general MPPT tracking range for 48V systems range from 60-100V to 60-120V. As most high performing 96 solar cell panels have a rated voltage below the minimum tracking values (eg. 52V), a 48V system would end up reducing the potential power generated by the solar panels. Additionally, panels with a rated voltage below 60V would have problems charging the battery even without the MPPT limitations, as the correct charge voltage for 48V li-ion batteries is approximately 56-58,4V This would result in slow charge and limited battery capacity amongst other complications. To accommodate this, a DC/DC 24V to 48V (15) converter can be installed between the load and the MPPT/Charge controller. Alternatively, two 72 solar cell panels can be used instead. They each have a maximum power voltage around 35-37V, so by connecting two PV panels in serial, the voltage increases to 70-74V, well within the tracking range of a 48V MPPT. This setup can be expanded with two PV panels more in serial. This therefore is a preferred embodiment of the invention aimed specifically for the DC variant used for telecom cooling systems.

The limitation in the MPPT tracking range when using 48V batteries is due to the charge algorithm of the MPPT. As most MPPTs are only able to transform the voltage down to the charge voltage, a safety cutoff is implemented in order to guarantee a sufficiently high voltage when charging. For 12V/24V/48V batteries the cutoff is usually at, respectively, 15V/30V/60V.

It is moreover important when using Li-ion batteries that the MPPT has a specialized charging algorithm for that specific type. Otherwise there is a large risk of damaging the batteries. This significantly limits the number of viable MPPT's on the market, as the usage of Li-ion batteries is still new, and not yet supported as standard.

Identifying the right MPPT required the comparison of at least 20 different options, where not only price, dimension and capacity were decisive. The following requirements for the MPPT had to be satisfied while attempting to keep the costs to a minimum:

Able to switch between 24 and 48V batteries.
Able to handle a 65.3V open circuit voltage
Able to track at 54.7V+/−10%
Minimum charge current at 20 A
Minimum panel input of 1 kW
Minimum load output of 0.66 kW
Maximum height of 60 mm to satisfy the requirements of a compact design
Allow for charging a variety of battery types, but at least Lithium-Ion, where some MPPT types are limited to lead acid only
Allow for a large range of PV-panels with varying capacities and dimensions In a preferred embodiment, the MPPT (3) employed is a 40 A MPPT from the company I-panda (Shenzhen I-Panda New Energy Technology & Science Co., Ltd.). Due to the safety cutoff for 48V batteries mentioned above, a 40 A MPPT is required to deliver 1 kW output.

The cooling module according to the present invention comprises three functional components: A vapor-compression refrigeration system, air flow chambers (interior and exterior) and one or more ventilating fans.

The cooling module is powered by the detachable solar power storage module, and can as a backup be supported with power from the grid in case of insufficient sunlight or energy stored in the solar power storage module. This allows for extra flexibility when grid connection is a possibility, allowing the system to provide power even after the battery unit (2) is empty. The power is drawn as AC current from the grid socket through an AC/DC converter (12) into the solar power storage module. Inside the system a switch (13) will swap between PV-panel/battery and grid power, according to the current voltage of the battery unit (2).

The vapor-compression refrigeration circuit is equipped with one, two or more heat exchangers, i.e. one or more condensers (28) and one or more evaporators (22). The evaporator (22) will draw in interior air through the internal air intake (24) from inside the building and lead it through the interior flow chamber and send it back through the internal air exhaust (25) with a lower temperature, thus effectively recycling and cooling the air inside the building. In an embodiment, suitable air filtration means are preferably located in, or adjacent to, the internal air intake (24) and/or the internal air exhaust (25), said filtration means preferably being replaceable. The filtration means can be of HEPA type.

The achievable temperature difference between the air intake (24) and exhaust (25) when the solar power airconditioning unit is running, ie the cool-down, will depend on many factors such as eg. the relative humidity and absolute temperature, but will typically amount to between 5-15° C., such as around 10° C.

In order to optimize the intake flow (24) the evaporators are rotated and installed on opposite sides of an array of fans (23). Two narrow evaporators are used instead of a single large in order to accommodate the design of the cooling module, as a wider heat exchanger would make the design too bulky. As indicated above, the interior flow chamber is closed, so it only allows recycling the air within the building. At the bottom of the interior flow chamber is placed a condensate drain (26) for removing water which is condensed when humid, warm air get into contact with the top of the evaporator. The flow paths are defined by the molded, expanded polystyrene walls (19) or a similar suitable material, which separates the interior from the exterior flow chamber. The flow paths have been designed to optimize the airflow, thereby insuring an optimal evaporator performance. As ambient air enters the ambient air intake (27) and is sucked through the condenser (28) by means of the condenser fan (29), the air is being heated by contacting the rear side of the PV panel (6). The increase in temperature of the ambient air in the external flow chamber generates a natural buoyancy, increasing the airflow across the evaporator and out through the ambient air exhaust (30). The polystyrene walls (19) serve an additional purpose. Due to the high insulating properties of materials like expanded polystyrene, the design of the flow paths helps preventing any unintended heat transfer between the two flow chambers or the surrounding environment.

In a preferred embodiment there is thus provided a method for cooling an airflow with a solar power airconditioning unit, said method comprising the steps of:
a. providing an airflow through at least one internal air intake (24) in the solar power airconditioning unit, preferably by means of ventilation, such as by means of evaporator fan (23),
b. providing the airflow through an evaporator (22) placed in the interior flow chamber inside the solar power airconditioning unit, whereby the airflow is subject to cooling by the evaporator (22),
c. providing the cooled airflow through at least one internal air exhaust (25) in the solar power airconditioning unit,
wherein the evaporator (22) is connected to a vapor-compression refrigeration system inside the solar power airconditioning unit further connected to a condenser (28), which is being cooled by an ambient airflow provided through the ambient air intake (27) by condenser fan (29), and wherein the vapor-compression refrigeration system and fans (23) and (29) are powered by the battery unit (2).

In a further preferred embodiment there is provided a method for providing a cooled airflow to a room or a building with a solar power airconditioning unit, said method comprising the steps of:
a. providing an airflow from the room or building through at least one internal air intake (24) in the solar power airconditioning unit, preferably by means of ventilation, such as by means of evaporator fan (23), comprised in the solar power airconditioning unit,
b. providing the airflow through an evaporator (22) placed in the interior flow chamber inside the solar power airconditioning unit, whereby the airflow is subject to cooling by the evaporator (22),
c. returning the cooled airflow through at least one internal air exhaust (25) in the solar power airconditioning unit to the room or building,
wherein the evaporator (22) is connected to a vapor-compression refrigeration system inside the solar power airconditioning unit further connected to a condenser (28), which is being cooled by an ambient airflow provided through the ambient air intake (27) by condenser fan (29), and wherein the vapor-compression refrigeration system and fans (23) and (29) are powered by the battery unit (2).

In a further preferred embodiment the temperature difference between the internal air intake (24) and the internal air exhaust (25) is between 5-15° C., such as around 10° C.

In a further embodiment the air inside a room or a building is cooled and recirculated by entering internal air intake (24) and leaving internal air exhaust (25).

In a second aspect, there is provided a solar power airconditioning unit comprising the same components as in the first aspect of the present invention, but where the evaporator (22) evaporator fan (23) condensate drain (26) and expansion valve (34) are placed indoors in a single unit, see FIG. 5. The indoor unit is preferably encased in a plastic casing to prevent access to moving parts and in a further embodiment accommodates means for the end user to control the system without a remote control.

Using a separate indoor unit has the following advantages:
It requires a smaller hole to be drilled through the external house wall
It allows for easier placement of the air outlet inside the room. Placing the outlet high near the ceiling helps to prevent buildup of a temperature gradient in the room as hot air rises. Furthermore, the room air circulation would benefit from natural convection forces as cold air falls to the floor.

The control module and its remote control allows the end user to set a desired temperature for the air recirculating through the solar power airconditioning unit. It also allows for defining a cooling period as a certain number of hours, or for setting a time of day for initiating and for cancelling the cooling process. The communication between the remote control and the control module can in an embodiment use an encrypted protocol for data transfer.

In an embodiment the control module and its remote control comprise means for controlling the recirculation/ventilation. In another embodiment the control module and its remote control further comprise means for controlling the temperature of a room whereto said solar power airconditioning unit is connected. In another embodiment the control module and its remote control further comprise means for controlling the temperature of the inside of the solar power airconditioning unit.

In a further embodiment there is provided a method whereby the flow of air through the interior flow chamber can be controlled by means of the control module, optionally by means of a remote control.

In a further embodiment there is provided a method whereby the temperature of air leaving internal air exhaust (25) can be controlled by means of the control module, optionally by means of a remote control.

The frame according to the present invention has the following functions:
To supply structural strength, allowing each component of the solar powered A/C device to be securely installed and fixated.

To provide an easy way of mounting and installing the system on a wall.

Allowing easy installation of the solar power storage module or replacing it with a cosmetic front, when using a split-system configuration.

Allowing attachment of an outer shell or casing, which shields the inside of the solar powered airconditioning device from the environment Furthermore the frame is constructed to allow the solar power airconditioning unit to be configured as a split-system where the detachable solar power storage module is detached from the rest of the unit and replaced by a cosmetic front. The detached solar power storage module can then be placed in a position which receives more sunlight, or is not overshadowed by trees or other structures which may cast a shadow. The frame construction further allows for attaching one, two or more additional PV panels to the solar power airconditioning unit, thereby boosting its maximum cooling power considerably. Alternatively one, two or more detachable solar power storage modules can be connected, thereby not only boosting the maximum cooling power of the solar power airconditioning unit considerably, but additionally adding substantial back-up power.

The frame is preferably made of aluminum or a similar strong and lightweight metal or metal alloy, or of fibreglass or a similar reinforced polymeric material. The inside of the solar powered airconditioning device is sealed from environmental exposure by an outer shell or casing which is attached to the frame. The shell can be produced of fibreglass or a similar material.

The mechanical design of the solar powered airconditioning device of the present invention has thus overall been developed to solve the following challenges:
- Preventing the components, especially the battery unit, from overheating
- Preventing heating of the recirculating airflow
- Preventing accidental access to components carrying an electric current,
- Protecting the components from the weather and general environmental exposure, thereby increasing component life and durability
- Allowing easy and efficient assembly during production
- Allowing easy, modular expansion of the system with more battery units and/or PV panels
- Allowing detachment of the solar power storage module when this is a better solution for the end-user
- Allowing partial separation of the cooling module and placing certain parts indoors, when this is a better solution for the end-user
- Ensuring a good integration between the electrical components and PV panels The solar powered airconditioning device according to the invention can be applied to buildings for cooling and/or ventilation of the entire building of just one or more rooms inside the building. The solar powered airconditioning device can be installed on the exterior wall and/or a roof construction and/or build into these parts of a building. The outside design of the solar powered airconditioning device can be varied, e.g. by using various materials for the outer shell and/or replacement front, to make it fit into various building constructions. In one embodiment of the invention a hardened glass front or glass panel is applied on the outside of the solar powered airconditioning device, providing the solar powered airconditioning device with a window-like appearance. The solar powered airconditioning device according to the invention is not limited to cooling and/or ventilation of buildings. Also cooling and/or ventilation of cars, trucks, caravans, mobile homes, ships, and/or the like can be provided by the solar powered airconditioning device according to the invention. Also cooling and/or ventilation of refrigerator containers and the like can be provided by the solar powered airconditioning device according to the invention.

The invention claimed is:

1. A solar power air conditioning unit, comprising:
   a detachable solar power storage module, comprising:
      a battery unit;
      a photovoltaic (PV) solar cell panel that charges the battery unit;
      a Maximum Power Point Tracking (MPPT) charge controller electrically connected to the battery unit and the PV solar cell panel;
      a first insulator configured to reduce heat transfer from the PV solar cell panel to the battery unit; and
      a cooler configured to maintain the battery unit at a temperature not exceeding a threshold value; and
   a cooling module, comprising:
      a vapor-compression refrigeration system;
      an interior and an exterior flow chamber;
      one or more ventilating fans;
      a condenser fan configured to provide air flow through a condenser of the vapor-compression refrigeration system and through a space between the detachable solar power storage module and the vapor-compression refrigeration system;
      a second insulator configured to reduce heat transfer from the solar power storage module to the interior flow chamber; and
      inlet and outlet tubes and wires; and
   a control module configured for remote control of the solar power air conditioning unit; and
   a frame configured to fixate and assemble the solar power storage module, the cooling module, and the control module into a single unit.

2. The solar power air conditioning unit according to claim 1, wherein the PV solar cell panel is a backside contact or rear contact solar cell panel.

3. The solar power air conditioning unit according to claim 1, wherein the battery unit and the MPPT charge controller are contained within a closed box closed with a top lid wherein the battery unit and the MPPT charge controller are fastened to an underside or subsurface of the top lid, the box being fastened to a rear side of PV panel.

4. The solar power air conditioning unit according to claim 1, furthermore comprising a replaceable filter located in, or adjacent to, an internal air intake, an internal air exhaust, or both.

5. The solar power air conditioning unit according to claim 1, wherein the control module is configured to control a ventilation.

6. The solar power air conditioning unit according to claim 1, wherein the control module is configured to control a temperature of a room whereto the solar power air conditioning unit is connected.

7. The solar power air conditioning unit according to claim 1, wherein the control module is configured to control a temperature of an inside of the solar power air conditioning unit.

8. A solar power air conditioning unit, comprising:
   a detachable solar power storage module, comprising:
      a battery unit;
      a photovoltaic (PV) solar cell panel that charges the battery unit;

a Maximum Power Point Tracking (MDPT) charge controller electrically connected to the battery unit and the PV solar cell panel;
a first insulator configured to reduce heat transfer from the PV solar cell panel to the battery unit; and
a cooler configured to maintain the battery unit at a temperature not exceeding a threshold value; and a cooling module, comprising:
a vapor-compression mfrigeration system;
an interior and an exterior flow chamber;
one or more ventilating fans;
a second insulator configured to reduce heat transfer from the solar power storage module to the interior flow chamber; and
inlet and outlet tubes and wires; and a control module configured for remote control of the solar power air conditioning unit; and
a frame configured to fixate and assemble the solar power storage module, the cooling module, and the control module into a single unit;
wherein the battery unit and the MPPT charge controller are contained within a closed box closed with a top lid wherein the battery unit and the MPPT charge controller are fastened to an underside or subsurface of the top lid, the box being fastened to a rear side of the PV solar cell panel.

9. The solar power air conditioning unit according to claim 8, wherein the PV solar cell panel is a backside contact or rear contact solar cell panel.

10. The solar power air conditioning unit according to claim 8, furthermore comprising a replaceable filter located in, or adjacent to, an internal air intake, an internal air exhaust, or both.

11. The solar power air conditioning unit according to claim 8, wherein the control module is configured to control a temperature of a room to which the solar power air conditioning unit is connected.

12. The solar power air conditioning unit according to claim 8, further comprising a condenser fan configured to provide air flow through both a condenser of the vapor-compression refrigeration system and a space between the detachable solar power storage module and the vapor-compression refrigeration system.

* * * * *